US006678129B2

(12) United States Patent
Koh et al.

(10) Patent No.: US 6,678,129 B2
(45) Date of Patent: Jan. 13, 2004

(54) PROTECTION CIRCUIT FOR A SWITCHED MODE POWER SUPPLY

(75) Inventors: Kian Meng Koh, Singapore (SG); Seng Huat Ng, Singapore (SG); Kum Yoong Zee, Johor (MY)

(73) Assignee: Thomson Licensing S.A., Boulogne Cedex (FR)

( * ) Notice: Subject to any disclaimer, the term of this patent is extended or adjusted under 35 U.S.C. 154(b) by 334 days.

(21) Appl. No.: 09/794,580

(22) Filed: Feb. 27, 2001

(65) Prior Publication Data
US 2001/0019469 A1 Sep. 6, 2001

(30) Foreign Application Priority Data
Mar. 2, 2000 (EP) .............................. 00104246

(51) Int. Cl.[7] ................................................ H02H 7/00
(52) U.S. Cl. ........................ 361/18; 361/93.1; 361/100
(58) Field of Search ......................... 361/18, 93.1, 90, 361/100

(56) References Cited

U.S. PATENT DOCUMENTS

| 5,796,596 A | 8/1998 | Williams |
| 6,031,734 A | 2/2000 | Hermann et al. |

FOREIGN PATENT DOCUMENTS

| DE | 3638035 | 5/1998 | |
| DE | 19735208 A1 | * 2/1999 | .......... H02M/3/335 |
| WO | 85/00933 | 2/1985 | |

OTHER PUBLICATIONS

Copy of Search Report.

* cited by examiner

Primary Examiner—Brian Sircus
Assistant Examiner—James A Demakis
(74) Attorney, Agent, or Firm—Joseph S. Tripoli; Harvey D. Fried; Sammy S. Henig

(57) ABSTRACT

The protection circuit comprises a clamping circuit with a switching element for reducing a supply voltage in case of an over voltage condition, and a holding circuit for providing a holding current for the clamping circuit. The clamping circuit comprises a threshold circuit, which provides a switching voltage for a switching element when the supply voltage reaches an upper voltage limit. The switching element is connected to a charge capacitor, which provides the switching-on voltage for the switching transistor, and by reducing this supply voltage, the switching of the switching transistor is disabled. The holding circuit comprises in particular a capacitor, which is coupled via a resistor to the clamping circuit for providing an additional current in case of an over voltage condition.

7 Claims, 2 Drawing Sheets

PROTECTION CIRCUIT FOR A SWITCHED MODE POWER SUPPLY

BACKGROUND

The present invention relates to a protection circuit for a switched mode power supply, which comprises a switching transistor and a transformer with a primary winding and an auxiliary winding for providing a supply voltage for driving the switching transistor.

A switched mode power supply of this kind is known for example from EP-A-0 936 726, which discloses self oscillating switched mode power supplies operating in a flyback mode. Specifically, FIG. 2 of EP-A-0 936 726 shows a switched mode power supply with a MOSFET as a switching transistor and a gate driver circuit comprising a charge capacitor being coupled via a diode to an auxiliary winding for providing a supply voltage for the gate driver circuit. It comprises further a threshold circuit, which keeps the gate driver circuit turned off after the switching-on of the switched mode power supply, until the supply voltage of the driver circuit has exceeded a specific threshold value with respect to the auxiliary winding. It comprises also an optocoupler for providing a regulating voltage from the secondary side of the power supply for the gate driver circuit for stabilizing output voltages.

A switched mode power supply as described before, which contains a protection circuit, is shown in FIG. 1. It comprises a switching transistor T20, which is connected with its current input to a primary winding W1 of a transformer, not shown, and with its current output via a resistor R20 to ground. The primary winding W1 is coupled in the usual manner to a rectifying element BR, which provides a rectified voltage from the mains voltage UM.

The transformer comprises further an auxiliary winding W2 for providing a supply voltage Vcc. The voltage Vcc is a rectified and smoothed voltage, rectified via diodes D25 and D26 which are connected to a terminal 3 of the auxiliary winding 2, and stabilized via capacitors C25 and C24 and a Zener diode D27. The power supply comprises further a start-up circuit with resistors R5, R6, R7 being connected to the capacitors C25 and C24 and to the rectifying element BR, and a gate driver circuit GD.

The gate driver circuit GD controls a transistor T25 which is coupled to the supply voltage Vcc for providing a switching-on voltage to the control electrode of the switching transistor T20 via resistors R21, R27 for switching through this transistor. Via the gate driver circuit GD the output voltages of the power supply are stabilized, a control circuit of this kind is explained for example in EP-A-0 936 726.

The base of transistor T25, together with the gate driver circuit GD, is connected to a threshold circuit with a Zener diode D23 and resistors R24, R26 for keeping the transistor T25 off after switching-on of the power supply, until the supply voltage Vcc has reached a sufficiently high voltage value for the start-up of the power supply. The power supply comprises further small capacitors C23 and C26 to suppress voltage spikes of the corresponding diodes.

The Zener diode D27 of FIG. 1 provides also an over voltage protection for the power supply. In a failure mode, when the output voltage at the auxiliary winding W2 shoots up, the voltage Vcc at capacitors C24, C25 will also rise accordingly, but is clamped by the Zener diode D27, in this embodiment to 20 Volts. Therefore, the current flowing through Zener diode D27 will increase which will finally kill this diode when reaching a certain current value. Once the Zener diode D27 is destroyed, it will become short circuited, which will shut off the switched mode power supply immediately because the supply voltage Vcc drops.

The switched mode power supply of FIG. 1 has also an underdrive protection, which ensures that there is always a sufficient gate drive for switching through the switching transistor T20 even during a failure condition. This requirement is necessary due to safety reasons. This problem is solved in that two diodes D25, D26 and two capacitors C24, C25 are arranged each in parallel, to provide always a supply voltage Vcc, even when one of the diodes or one of the capacitors is open circuited.

The over voltage protection as described before is only working in switched mode power supplies with higher output power, for example 70 Watts, but not with switched mode power supplies limited to about 30 Watts, because then the current flowing through the Zener diode D27 is too low to destroy the Zener diode in case of an over voltage failure mode. In this case the output voltages of the power supply will continue to rise and this will damage the respective components of the device, for example capacitors and integrated circuits.

The object of the present invention is therefore, to provide a protection circuit, which works also reliably within a low power switched mode power supply, and to provide a respective switched mode power supply.

SUMMARY OF THE INVENTION

The protection circuit of the present invention comprises a clamping circuit with a switching element for reducing said supply voltage in case of a failure, especially in case of an overvoltage condition, and a holding circuit for providing a holding current for said clamping circuit. With the holding current the switch-off time in case of a failure is extended which avoids therefore an immediate start-up of the power supply when the supply voltage is reduced, and which would lead to a hiccup stage.

The clamping circuit comprises advantageously a threshold circuit, which provides a switching voltage for the switching element when the supply voltage reaches an upper voltage limit. The switching element is connected to a charge capacitor which provides the supply voltage for the switching transistor, and by reducing this supply voltage the switching of the switching transistor is disabled.

The holding circuit comprises in particular a capacitor which is coupled via a resistor to the clamping circuit, especially to the threshold circuit, for providing an additional current also in a failure mode. In a special embodiment the capacitor of the holding circuit is connected via a rectifying element to an auxiliary winding of the transformer, but can be coupled also to another input voltage of the power supply.

The protection circuit may be used especially for a switched mode power supply comprising a transformer with a primary winding and an auxiliary winding, and a switching transistor which is coupled to said primary winding and which is operating in a flyback mode. It works not only in power supplies with low power applications but also in power supplies providing high output power. For smaller switched mode power supplies, it is especially advantageous to use a MOSFET as a switching transistor and the clamping circuit therefore disables directly the gate drive of the MOSFET in case of an over voltage condition. Low power supplies for example with an output power of 30 Watts can be used for example as a second power supply within appliances of consumer electronics products.

BRIEF DESCRIPTION OF THE DRAWINGS

The invention is explained in more detail below by way of a preferred embodiment, with reference to schematic circuit diagrams, in which.

DETAILED DESCRIPTION OF THE PREFERRED EMBODIMENTS

Figure 2:
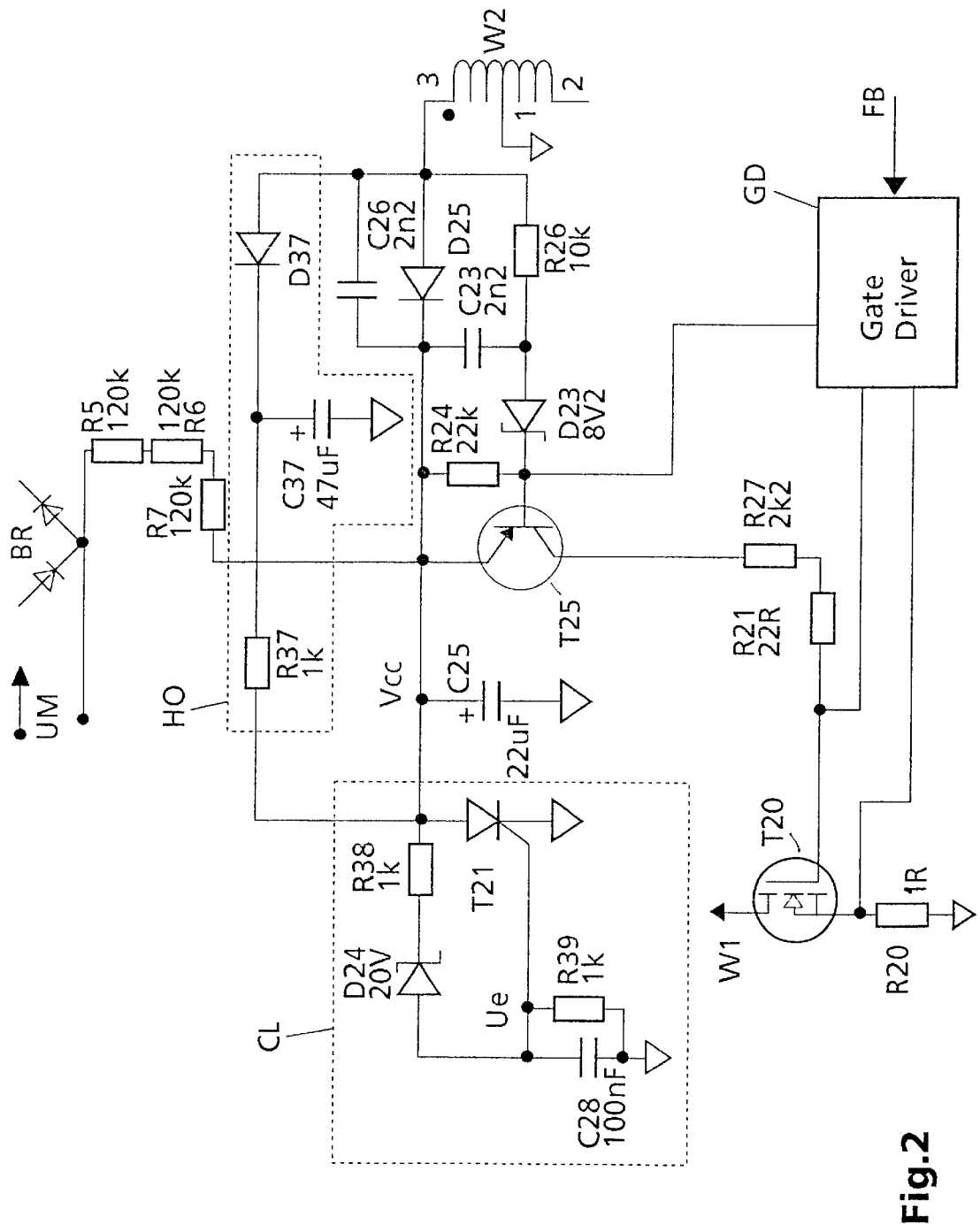
FIG. 2: A protection circuit with a clamping circuit and a holding circuit according to the invention.

In FIG. 2 the primary side of a switched mode power supply is shown with a MOSFET as a switching transistor T20, which is coupled with the current input to a primary winding W1 of a transformer (not shown) and with a current output via resistor R20 to ground. Other types of switching transistors can be used accordingly. To the other end of the primary winding W1 a DC voltage is coupled in a known manner which is provided in this embodiment from the mains voltage UM via a rectifying element BR. To the rectifying element BR also the start-up circuit with resistors R5, R6 and R7 is coupled.

The control input of the switching transistor T20 is controlled via a transistor T25, which is connected with its current input to a supply voltage Vcc. The supply voltage Vcc is provided from the auxiliary winding W2 of the transformer via a rectifying element D25 and is smoothed via a charge capacitor C25. A gate driver circuit GD, shown only schematically, provides switching pulses for the transistor T25 for regulating the output voltages of the power supply. When the transistor T25 is switched through, the supply voltage Vcc is coupled via resistors R21 and R27 to the gate electrode of the switching transistor T20, and when the transistor T25 closes, the switching transistor T20 is also closed via the gate driver circuit GD.

Figure 1:
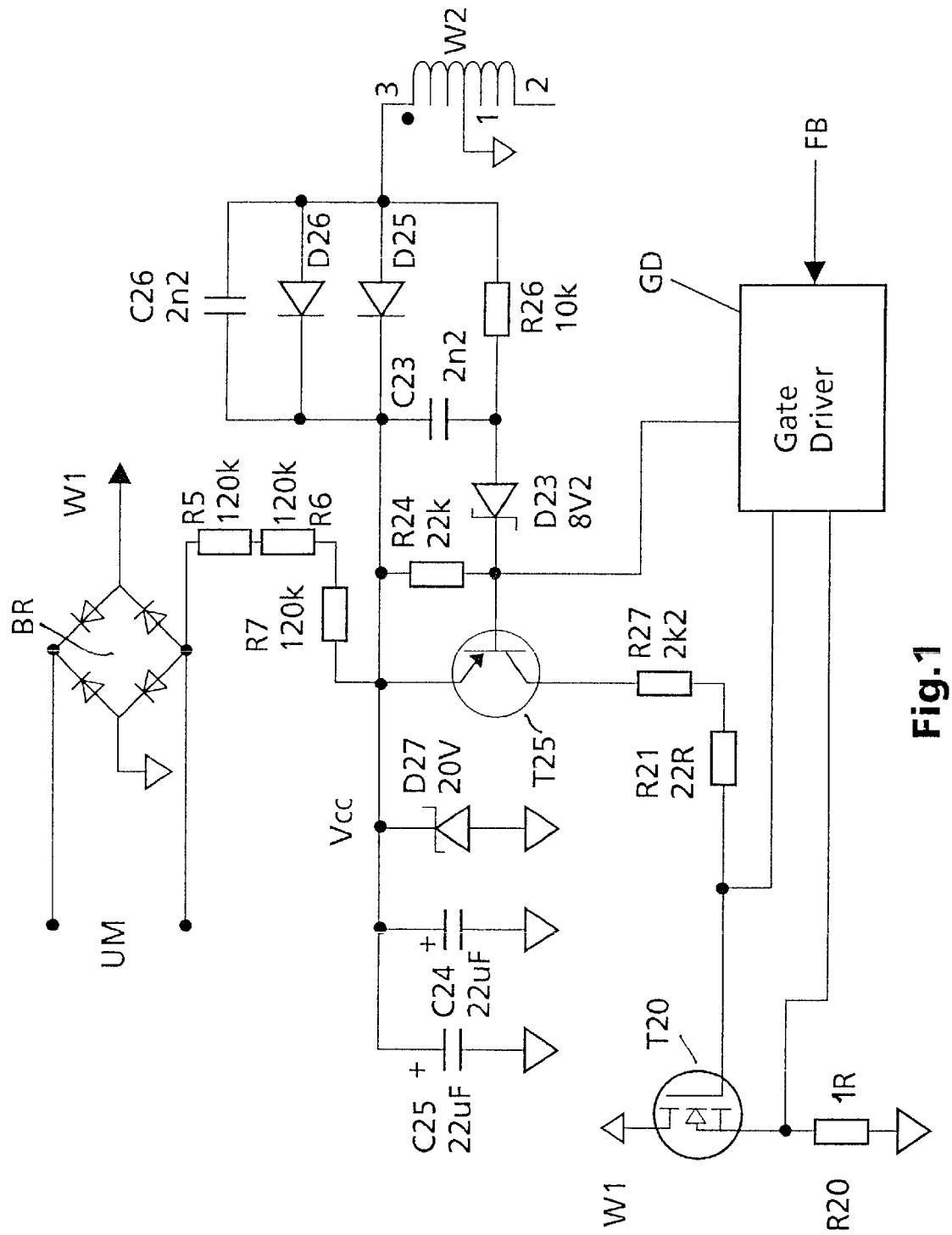
FIG. 1: A circuit with a Zener diode for providing an overvoltage protection for a switched mode power supply.

The basic components of the switched mode power supply as shown in FIG. 2 is similar to the circuit as already described according to FIG. 1, and which operating principles are described in detail in EPA-0 936 726. Circuit components in FIG. 2 which are the same as in the FIG. 1 have same reference numbers.

To the charge capacitor C25 a clamping circuit CL is coupled for providing an overvoltage protection. It comprises a switching element T21, in this embodiment a thyristor, which disables the gate drive of the switching transistor T20 when switched through, in that the supply voltage Vcc is connected to ground. The control electrode of the switching element T21 is controlled via a threshold circuit with a Zener diode D24 and a resistor R38 which provides a switching voltage Ue when the supply voltage Vcc exceeds a certain threshold, in this example 20 Volts. When the Zener diode D24 starts conducting, the control voltage Ue shoots up and triggers the switching element T21. The control electrode of the switching element T21 is coupled via a resistor R39 and a capacitor C28 in parallel to ground for disabling the control voltage Ue when the Zener diode D24 stops conducting.

When the supply voltage Vcc drops below the threshold value of the threshold circuit D24, R38, then also the control voltage Ue drops which closes the switching element T21. Then the power supply will start-up again and, when the overvoltage condition still appears, will shut down again when the threshold value is exceeded. In this case the power supply would be in a hiccup stage which would be an additional stress for the power supply and would make a switching sound which could be heard by a user.

To suppress this hiccup stage, the power supply comprises a holding circuit HO. This holding circuit provides an additional current for the clamping circuit CL to turn the switching element T21 on for a longer period. The holding circuit HO comprises a capacitor C37 in which a charge is stored during normal operation and which is connected to the clamping circuit CL via a resistor R37. In this embodiment the capacitor C37 is coupled to the auxiliary winding W2 of the transformer, but it can be coupled also to another part of the power supply, for example to the start-up circuit. With the additional holding current, the annoying switching sound of the hiccup stage is modified to a more smoother tone.

The clamping circuit CL is very sensitive to an overvoltage condition of the supply voltage Vcc because of the threshold circuit D24, R38 and the switching element T21. It provides therefore an overvoltage protection for switched mode power supplies with high output power as well as for switched mode power supplies with low output power. In addition, the clamping circuit CL together with the holding circuit HO provide also an under drive protection, as can be seen from FIG. 2. In the case the diode D25 is open circuited, the power supply has the additional current path via D37 and R37 to charge the charge capacitor C25. And in the case capacitor C25 is open circuited, the capacitor C37 is available to provide the necessary gate drive voltage for the switching transistor T20. Therefore, with a few additional components a reliable circuit is provided which provides an overvoltage protection as well as an under drive protection.

The overvoltage protection circuit as explained is not restricted for a use with a power supply as described with regard to FIG. 2. Applications for other power supplies, for example for a DC—DC converter, are also possible.

What is claimed is:

1. Protection circuit for a switched mode power supply having a switching transistor, a transformer with a primary winding and an auxiliary winding, and a charge capacitor coupled via a rectifying element to said auxiliary winding for providing a smoothed supply voltage for said switching transistor, the protection circuit comprising:

a clamping circuit with a switching element for reducing said supply voltage in case of an over voltage condition, said clamping circuit being coupled to said charge capacitor, and a holding circuit for providing a holding current for said clamping circuit, said holding circuit being coupled to said clamping circuit and to said charge capacitor with one end and to said auxiliary winding with a second end, said holding circuit comprising a capacitor being coupled via a resistor to said clamping circuit and to said charge capacitor for providing an additional current also in said over voltage condition.

2. Protection circuit according to claim 1, wherein said clamping circuit comprises a threshold circuit for disabling the switching cycles of said switching transistor via said supply voltage in case of an over voltage.

3. Protection circuit according to claim 2, wherein said threshold circuit comprises a Zener diode being coupled to said switching element for providing a switching voltage in case of an over voltage.

4. Switched mode power supply comprising:

a transformer with a primary winding and an auxiliary winding and a switching transistor coupled to said primary winding, and a protection circuit comprising
- a clamping circuit with a switching element for reducing said supply voltage in case of an over voltage condition, said clamping circuit being coupled to said charge capacitor, and
- a holding circuit for providing a holding current for said clamping circuit, said holding circuit being coupled to said clamping circuit and to said charge capacitor with one end and to said auxiliary winding with a second end, said holding circuit comprising a capacitor being coupled via a resistor to said clamping circuit and to said charge capacitor for providing an additional current also in said over voltage condition.

5. Switched mode power supply according to claim 4, wherein said switching transistor is a MOSFET and the clamping circuit of said protection circuit disables the gate drive of said MOSFET in case of an over voltage condition.

6. Switched mode power supply according to claim 4, wherein said supply is operative as a self-oscillating switched mode power supply and in a flyback mode.

7. A protection circuit comprising
- a clamping circuit with a switching element for reducing a supply voltage in case of an over voltage condition, said clamping circuit being coupled to a charge capacitor, and
- a holding circuit for providing a holding current for said clamping circuit, said holding circuit being coupled to said clamping circuit and to said charge capacitor with one end and to an auxiliary winding with a second end, said holding circuit comprising a capacitor being coupled via a resistor to said clamping circuit and to said charge capacitor for providing an additional current of said over voltage condition.

* * * * *